United States Patent [19]

Lam et al.

[11] Patent Number: 5,004,481

[45] Date of Patent: Apr. 2, 1991

[54] FUEL COMPOSITIONS CONTAINING SULFUR-BRIDGED PHENOLIC ANTIOXIDANTS

[75] Inventors: William Y. Lam, Ballwin; Gregory P. Liesen, St. Louis, both of Mo.

[73] Assignee: Ethyl Corporation, Richmond, Va.

[21] Appl. No.: 519,416

[22] Filed: May 4, 1990

Related U.S. Application Data

[62] Division of Ser. No. 389,329, Aug. 3, 1989, Pat. No. 4,946,610.

[51] Int. Cl.$^5$ ............................................. C10L 1/24
[52] U.S. Cl. ................................................... 44/435
[58] Field of Search ......................................... 44/435

[56] References Cited

U.S. PATENT DOCUMENTS

| | | | |
|---|---|---|---|
| 2,385,158 | 9/1945 | Paulsen et al. | 44/435 |
| 3,067,259 | 12/1962 | Bailey | 44/435 |
| 3,069,384 | 12/1962 | Coffield | 44/435 |
| 3,129,213 | 4/1964 | Worrel | 44/435 |
| 3,168,480 | 2/1965 | Worrel | 44/435 |
| 3,211,794 | 10/1965 | Coffield | 44/435 |
| 3,234,285 | 2/1966 | Moss et al. | 44/435 |
| 3,250,712 | 5/1966 | Coffield | 44/435 |
| 3,326,800 | 6/1967 | Coffield | 44/435 |
| 3,929,654 | 12/1975 | Brewster et al. | 44/435 |

*Primary Examiner*—Jacqueline V. Howard
*Assistant Examiner*—Jerry D. Johnson
*Attorney, Agent, or Firm*—David M. Bunnell

[57] ABSTRACT

Fuel compositions contain a liquid, sulfur-bridged, hindered phenol antioxidant composition prepared by reacting a mixture of hindered phenols with a sulfur chloride in the presence of a polar modifier.

5 Claims, No Drawings

FUEL COMPOSITIONS CONTAINING SULFUR-BRIDGED PHENOLIC ANTIOXIDANTS

This application is a division of application Ser. No. 389,329, filed Aug. 3, 1989 now U.S. Pat. No. 4,946,610.

BACKGROUND OF THE INVENTION

This invention relates generally to sulfur-bridged phenols useful as antioxidants and more specifically to the preparation of a liquid, sulfur-bridged, hindered phenol composition which is an effective antioxidant in lubricating oils without causing excessive copper corrosion.

The antioxidant use of hindered, sulfur-bridged phenols having a branched alkyl group on the alpha carbon atom and made by reacting the phenol with sulfur dichloride in a solvent with recovery of a crystalline product from the reaction mixture is disclosed in U.S. Pat. No. 3,250,712. The preparation of a crystalline 4,4-thiobis-(2,6-di-t-butylphenol) product by reacting the phenol with a sulfur halide in a solvent such as acetonitrile, carbon disulfide or carbon tetrachloride with or without a catalyst followed by treating the reaction mixture with alkali hydroxide in alcohol is disclosed in U.S. Pat. No. 3,678,115. The preparation of a liquid lubricant oil additive mixture of 45–75 wt % ortho-alkylphenol and certain amounts of mono, di, tri and tetrasulfides of the phenol by the reaction of an excess of the phenol with sulfur using an organic amine catalyst is disclosed in U.S. Pat. No. 3,929,654. It is also reported in this patent that sulfurized alkylphenols prepared by reacting an alkylphenol with sulfur mono- or dichloride tend to cause copper corrosion probably due to the presence of corrosive sulfur species such as sulphochlorinated alkylphenol.

BRIEF SUMMARY OF THE INVENTION

We have now prepared a liquid mixture of hindered, sulfur-bridged phenols with good oil solubility, compatibility, antioxidant and copper corrosion properties using a sulfur chloride for sulfurization.

In accordance with this invention there is provided a liquid, sulfur-bridged, hindered phenol product prepared by the process comprising reacting a liquid mixture of phenols containing at least two hindered phenols, each phenol having at least one hydrogen in the ortho or para position, with a sulfur chloride, in amounts of from about 0.45 to 0.55 mole of sulfur chloride per mole of phenol, in the presence of an amount of polar modifier which is effective to reduce the copper corrosion properties of said product and recovering the liquid, sulfur-bridged, hindered phenol product.

Also provided are lubricating and fuel compositions comprising a major amount of a fuel or oil of lubricating viscosity and an antioxidant amount of the above liquid, sulfur-bridged, hindered phenol product.

DETAILED DESCRIPTION

An advantage of this invention is the liquid nature of the sulfur-bridged, alkylphenol product which facilitates its handling and dissolving in fuels, lubricating oils and other oxygen sensitive materials. The initial phenol mixture to be sulfurized should contain at least two different hindered phenols each having at least one hydrogen in the ortho or para position in proportions to provide a liquid product at ambient temperatures (20° C. –25° C.) from which solid material will not separate on standing. By hindered phenol is meant that the phenol is substituted in at least one ortho position with a branched chain $C_3$ to $C_{12}$ alkyl group and preferably a $C_4$–$C_6$ alkyl group. Examples of suitable ortho-alkylphenols include:

2-tert-butylphenol
2,6-di-tert-butylphenol
2,4-di-tert-butylphenol
2-isopropylphenol
2,6-diisopropylphenol
2,4-diisopropylphenol
2-sec-butylphenol
2,6-di-sec-butylphenol
2,4-sec-butylphenol
2-tert-hexylphenol
2,6-di-tert-hexylphenol
2-tert-butyl-p-cresol
2-tert-butyl-o-cresol
2-tert-dodecylphenol
2-tert-dodecyl-p-cresol
2-tert-decyl-o-cresol
2-tert-butyl-6-isopropylphenol Suitable mixtures contain up to about 95 weight percent of each reactive hindered phenol with the remainder being one or more different phenols. Normally two reactive hindered phenols are each present in at least about 5 weight percent. By a reactive phenol is meant a phenol having at least one hydrogen in the ortho or para positions to the hydroxyl group. The mixture preferably contains at least about 50 weight percent, and most preferably at least about 75 weight percent, of a di-ortho, branched chain alkylphenol such as 2,6-di-tert-butyl phenol. The mixture can also contain minor amounts of up to about 25 weight percent of 2,4,6-trialkyl substituted phenols which are not sulfurized in the reaction.

The phenol is reacted with either sulfur mono- or dichloride in amounts of from about 0.45 to 0.55 mole per mole of reactive hindered phenols in the mixture in the presence of a polar modifier. By polar modifier is meant a normally liquid organic compound containing at least one polar substituent which compound does not react with sulfur chloride or otherwise decompose under the reaction conditions but does act to change the sulfurized phenolic product mixture such that the product is less corrosive to copper. Examples of such compounds include acetonitrile, nitromethane, formamide and nitrobenzene. The modifier should be present in an sufficient amount which is effective to reduce the copper corrosion properties of the product to an ASTM D-130 test value of or better and also avoid the formation of any significant deposit on the copper. Above about 10 wt percent and, preferably, from about 15 to 150 weight percent of modifier based on the weight of phenol in the reaction mixture, is used. The use of larger amounts of modifier is not necessary and excessive amounts, which cause the formation of sufficient mono and dithio bridged crystalline products to interfere with the liquid nature of the product, should be avoided. Mixtures of polar modifiers can be used. The reaction is exothermic and the reaction temperature is preferably kept at from about 15° C. to 70° C. (most preferably from about 35° C. to 55° C.) by controlling the rate of sulfur chloride addition to the phenolic mixture which usually takes from about 1 to 3 hours. Heat may be added to finish the reaction and keep the temperature within the preferred range. Higher or lower temperatures can be used so long as the reaction is completed without decomposing the product or producing a significant amount of side products.

After the reaction is completed, the modifier is removed, preferably by vacuum distillation. A diluent oil or solvent such as toluene, xylene or the like can be added to the remaining product mixture and the product mixture filtered to remove any solids. Usually from about 5 to 25 wt percent diluent oil is used.

The liquid antioxidant product includes, depending upon the phenols in the initial mixture, mixtures of sulfur bridged bis and/or polyphenol compounds such as are represented by the formulae I and II;

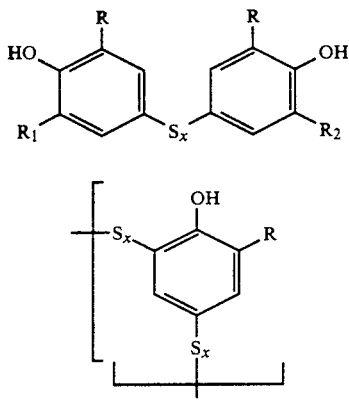

The amount of unreacted phenols which contain an ortho or para hydrogen is less than about 20 weight percent.

The products are added to lubricating compositions or liquid organic fuels in antioxidant effective amounts which generally range from about 0.05 to 5.0 wt percent, and preferably 0.1 to 2.0 wt percent, based on the total weight of composition.

The products can be added to the oil or fuel in the form of additive concentrates usually containing a diluent oil or solvent and other additives. The amount of product in the concentrates will generally vary from about 0.5 to 50 weight percent or more.

Lubricating composition base stock oils include natural and synthetic oils having viscosities which generally range from about 2.5 to 12 cps at 100° C. depending upon the particular lubricant application. The compounds of the invention are especially useful in crankcase lubricants where they act as antioxidants and reduce sludge formation.

Advantageous results also are achieved by employing the antioxidant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

The additives of the present invention may be suitably incorporated into synthetic base oils such as alkyl esters of dicarboxylic acids, polyglycols and alcohols, polyalphaolefins, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinic-naphthenic, and the like; as well as to their formation, e.g., distillation range, straight run or cracked, hydrorefined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, molecular sieves, etc.

The compositions of the invention can also be employed in gasoline gasohol and in middle distillate fuels such as diesel fuel, furnace oil and jet fuel.

The invention is further illustrated by, but is not intended to be limited to, the following examples wherein parts and percentages are by weight unless otherwise indicated.

EXAMPLE 1

A 4-neck reactor was equipped with a mechanical stirrer, condenser, thermometer and addition funnel. The off-gas outlet of the condenser was connected to a HCl scrubber containing an aqueous NaOH solution. A charge of 937.0 grams of a phenolic mixture containing about 75 wt % 2,6-di-tert-butyl phenol, 2 wt % 2,4-di-tert-butyl phenol, 10% ortho-tert-butyl phenol and 13% 2,4,6-tri-tert-butyl phenol and 235.6 grams (25 wt percent) of acetonitrile was placed in the reactor and agitation started. The $S_2Cl_2$, 279.0 grams, was added dropwise over a period of about 1.5 hours. The temperature rose due to the exotherm to 47° C. After the $S_2Cl_2$ addition was completed the reaction mixture was maintained at about 55° C. with heating for 0.5 hour. The temperature was then raised to 70° C. to vacuum distill the acetonitrile with the batch held under full vacuum (30–50mm Hg) for 1 hour. The vacuum was broken and 120 grams of process oil #5 were added to the product and the product was filtered to remove a small amount of crystalline material which was formed in the reaction. The product contained 10.9 wt percent sulfur and 1.3 wt percent chlorine.

COPPER CORROSION TEST (D-130)

Lubricant compositions of a fully formulated 5W-30 crankcase lubricant oil containing 0.75 and 1.2 weight percent of the product prepared in Example I were tested in the D-130 test at 121° C. for 3 hours.

This test indicates the resistance of the lubricant to corrosion of copper. A freshly refinished copper strip is placed in a 1×6 in. (25.4×152.4 mm.) test tube with 25 grams of the oil being tested. The tube is placed in a heated bath for the proper period of time. After removal from the bath, the condition of the strip is compared with a set of standard strips and given a rating according to the standard strip most closely matched. The ratings ranged from 1 to 4 with letters a to d for intermediate ranges.

The results are reported in Table I below along with a comparison lubricant containing a product prepared according to Example 1 except that no acetonitrile modifier was used, the distillation strip step was replaced by a 30 minute nitrogen purge followed by a 30 minute vacuum strip and the product was not filtered.

TABLE I

| | D-130 Copper Corrosion | |
|---|---|---|
| Additive | Product of Ex 1 | Comparison |
| 0.75 wt % | 1b | 4a |
| 1.20 wt % | 1b | — |

From the results reported in Table I, the product of the invention gave acceptable copper corrosion results whereas the product prepared without the solvent caused severe copper corrosion.

EXAMPLE 2

To a 500 mL reactor were added 90.0 grams of the phenolic mixture according to Example 1 and 45.1 grams (50 wt %) of $CH_3CN$ and the mixture was heated to 50° C. $S_2Cl_2$ (26.8 grams) was added slowly over a period of 1 hour and 10 minutes. The resulting batch was held at 50° C. under a $N_2$ sweep for 1 hour. The acetonitrile was then removed by vacuum stripping to give a dark brown viscous product (106.4 grams), (analysis: 12.9% S).

EXAMPLE 3

To a 250 mL reactor were added 90.8 grams of the phenolic mixture according to Example 1 and 45.1 grams (50 wt %) $CH_3CN$ and to the mixture were added 27.0 grams of $S_2Cl_2$ dropwise at 23° C. over a period of about 40 minutes. The batch temperature peaked at 42° C. and no foaming occurred. The resulting batch was heated at 55° C. for 30 minutes followed by vacuum distillation of the acetonitrile. The batch temperature was gradually allowed to go up to 70° C. A crystalline solid was seen forming over the batch surface level. After vacuum stripping at 70°-75° C. for 1 hour, the batch (105 grams) was diluted and filtered through a Whatman No. 54 paper to give a 90% active, clear, amber viscous liquid with process oil #5 (11.7 grams) (analysis: 11.4% S, 1.27% Cl).

EXAMPLE 4

To a 500 mL reactor were added 37.5 grams of 2,6-di-t-butylphenol, 51.5 grams of o-t-butylphenol and 45 grams $CH_3CN$ and the mixture was cooled to 1.C by an ice water bath. $S_2Cl_2$ (33.8 grams) was added dropwise over a period of about 60 minutes. The resulting batch was then allowed to warm to room temperature gradually and kept under a gentle $N_2$ sweep overnight.

The batch was transferred to a round-bottom flask and the acetonitrile was stripped in vacuum at 70° C. The resulting material was dissolved in pentane —$CHCl_3$ (small amount) and the solution was washed with water twice. The solution was then dried over $Na_2SO_4$, filtered, and stripped of solvent in vacuum at 70° C. to give a brown viscous liquid (analysis: 14.9% S).

EXAMPLE 5

To a 500 mL reactor were added 90 grams of a phenolic mixture according to Example 1, 0.1 gram Fe powder as catalyst, and 100 grams (111 wt %) of $CH_3CN$. To this mixture were added 26.7 grams of $S_2Cl_2$ slowly at room temperature over a period of 75 minutes. The temperature reached at 39° C. during $S_2Cl_2$ addition. After $S_2Cl_2$ addition was completed, the batch was heated and held at 45°-50° C. for 1 hour, $N_2$ was then allowed to blow over the batch for 30 minutes to faciliate the removal of HCl. The acetonitrile was then distilled at 70° C. under vacuum and a dark brown liquid was obtained. The liquid was dissolved in heptane (~100 grams) and the solution was washed three times with water, dried over anhydrous $Na_2SO_4$ and then filtered. Removal of solvent at 70° C. under vacuum gave a brown liquid which was filtered through a filter-aid coated Whatman #54 paper (weight of product = 106.5 grams; analysis: 12.2% S).

EXAMPLE 6

To a 250 mL reactor were added 100 grams of the phenolic mixture according to Example 1 and 20 grams (20 wt %) of acetonitrile and to the resulting solution was added dropwise 29.7 grams of $S_2Cl_2$ at room temperature. The addition of $S_2Cl_2$ was completed in about 1 hour and the batch temperature reached 37° C. The resulting batch was then held at 50°-55° C. for 1 hour and the acetonitrile was then vacuum stripped from 55°-70° C. After stripping for about 1 hour, process oil #5 (12.8 grams) was added to the batch and the diluted batch was filtered through a Whatman #54 paper. A clear brown viscous liquid (115 grams) was obtained.

EXAMPLE 7

To a 250 mL reactor were added 89.8 grams of the phenolic mixture according to Example 1 and 22.5 grams (25 wt %) of $CH_3CN$ and to the solution were added 26.7 grams of $S_2Cl_2$ dropwise at room temperature. The batch temperature reached 44° C. due to the exotherm. The addition was completed in about 20 minutes. The resulting batch was held at 50°-55° C. for 30 minutes. The acetonitrile was distilled under vacuum from 55° -70° C. and held at the 70° C. for 1 hour. To the stripped material was added process oil #5 (11.5 g) and the resulting batch was stripped at 80° C. for 30 minutes to remove some crystalline solid formed in the reaction (weight of product =103.7 grams; analysis: 11.1% S, 1.46% Cl).

COMPARISON

To a 250 mL reactor were added 95.2 grams of the phenolic mixture according to Example 1 and 9.6 grams (0 wt %) of $CH_3CN$ and to the solution were added 28.3 grams of $S_2Cl_2$ dropwise over a period of about 30 minutes. The resulting batch was held at 50° to 55° C. for 30 minutes and the acetonitrile wa then vacuum-distilled from 55° to 70° C. The batch was held at 70° C. under vacuum for 1 hour. To the resulting batch was added process oil #5 (12.2 grams) and the diluted product was filtered to give a brown liquid product (110 grams; analysis: 11.3% S, 8% Cl).

COPPER CORROSION TEST (D-130)

Lubricant compositions of a full formulated 5W-30 crankcase lubricant oil containing 0.75 weight percent of the products prepared in Examples 6 and 7, along with the product prepared in the comparison synthesis using only 10 wt percent of polar modifier based on the amount of phenols, were prepared and tested in the D-130 test as described in Example 1. The results are given in Table II below:

TABLE II

| Additive | Wt % Acetonitrile | % Additive in Oil | D-130 |
|---|---|---|---|
| Comparison | 10 | 0.75 | Moderate |

TABLE II-continued

| Additive | Wt % Acetonitrile | % Additive in Oil | D-130 |
|---|---|---|---|
| Ex 6 | 20 | 0.75 | Deposit 1b/trace deposit |
| Ex 7 | 25 | 0.75 | 1b |

According to the test results, the oil containing the additive prepared using a polar modifier at 10 wt percent produced a deposit on the copper strip which could not even be rated for corrosion and represented an unsatisfactory result. The oil containing the additive of Example 6 prepared at the 20 wt percent modifier level gave a passing 1b copper corrosion result with a trace deposit. Example 7 at the 25 wt percent modifier level gave a 1b result with no deposit. Accordingly, an effective amount of modifier is above about 10 wt percent of the phenols.

We claim:

1. A fuel composition comprising a liquid fuel and from about 0.05 to 5.0 weight percent of a liquid, sulfur-bridged hindered phenol product prepared by the process comprising reacting a liquid mixture of phenols, which mixture contains at least two different hindered phenols each phenol having at least one hydrogen in the ortho or para position, with a sulfur chloride, in amounts of from about 0.45 to 0.55 mole of sulfur chloride per mole of phenol, in the presence of an amount of a nitrogen containing polar modifier which is effective to reduce the copper corrosion properties of said product and recovering the liquid, sulfur-bridged hindered phenol product.

2. The fuel composition of claim 1 wherein said liquid mixture of phenols contains at least two hindered phenols which are each present in from about 5 to 95 weight percent based on the weight of said liquid mixture of phenols.

3. The fuel composition of claim 2 wherein said liquid mixture of phenols includes at least about 50 weight percent of a di-ortho, branched chain $C_3$–$C_{12}$ alkyl phenol.

4. The fuel composition of claim 1 wherein the liquid mixture of phenols includes from about 5 to 95 percent by weight of 2,6-di-tert-butylphenol, from about 5 to 95 percent by weight of 2-ortho-tert-butylphenol and the polar modifier is acetonitrile.

5. The fuel composition of claim 4 wherein the liquid mixture of phenols contains at least about 50 weight percent of 2,6-tert-butylphenol and the acetonitrile is present in an amount of from abut 15 to 150 weight percent based on the weight of said liquid mixture of phenols.

* * * * *